United States Patent
Boske

(10) Patent No.: US 10,150,169 B2
(45) Date of Patent: Dec. 11, 2018

(54) SYSTEM FOR RELEASABLE COUPLING OF A HOLE SAW TO A DRILL ARBOR

(71) Applicant: Boorwerk B.V., Almere (NL)

(72) Inventor: Richard Alexander Boske, Bussum (NL)

(73) Assignee: BOORWERK B.V., Almere (NL)

( * ) Notice: Subject to any disclaimer, the term of this patent is extended or adjusted under 35 U.S.C. 154(b) by 0 days.

(21) Appl. No.: 15/523,962

(22) PCT Filed: Nov. 9, 2015

(86) PCT No.: PCT/NL2015/050779
§ 371 (c)(1),
(2) Date: May 3, 2017

(87) PCT Pub. No.: WO2016/072856
PCT Pub. Date: May 12, 2016

(65) Prior Publication Data
US 2017/0341161 A1 Nov. 30, 2017

(30) Foreign Application Priority Data
Nov. 7, 2014 (NL) ...................................... 2013758

(51) Int. Cl.
*B23B 51/04* (2006.01)
*B23B 31/107* (2006.01)

(52) U.S. Cl.
CPC ...... *B23B 51/0473* (2013.01); *B23B 31/1071* (2013.01); *B23B 51/0426* (2013.01);
(Continued)

(58) Field of Classification Search
CPC ......... Y10T 279/1041; Y10T 279/1045; Y10T 279/1091; Y10T 408/895; B23B 51/0473
See application file for complete search history.

(56) References Cited

U.S. PATENT DOCUMENTS 1,864,466 A * 6/1932 Peterson ............. B25B 23/0035
279/2.12
3,115,798 A * 12/1963 Donaway .............. B23B 31/208
279/2.11
(Continued)

FOREIGN PATENT DOCUMENTS

DE 202007001457 U1 5/2007
DE 102006021715 A1 11/2007
(Continued)

OTHER PUBLICATIONS

International Search Report PCT/ISA/210 for International Application No. PCT/NL2015/050779 Dated Mar. 23, 2016.
(Continued)

*Primary Examiner* — Daniel Howell
(74) *Attorney, Agent, or Firm* — Harness, Dickey & Pierce, P.L.C.

(57) ABSTRACT

A system is disclosed for releasable coupling of a hole saw to a drill arbor. The system includes an elongate drill arbor configured at a first end to be clamped in a drill chuck of a drill, and a hole saw adapter provided with a longitudinal bore in which the drill arbor can be received so that an inner surface of the longitudinal bore of the hole saw adapter is mounted slidably on an outer surface of the drill arbor in the longitudinal direction of the drill arbor. The drill arbor includes an actuator member and at least one retaining element co-acting therewith. The inner surface of the longitudinal bore of the hole saw adapter is provided with a recess into which the retaining element of the drill arbor can protrude.

18 Claims, 7 Drawing Sheets

(52) U.S. Cl.
CPC .... *B23B 51/0453* (2013.01); *B23B 2260/022* (2013.01); *B23B 2265/326* (2013.01); *Y10T 279/1045* (2015.01); *Y10T 279/1091* (2015.01); *Y10T 408/895* (2015.01)

(56) References Cited

U.S. PATENT DOCUMENTS

| | | | | |
|---|---|---|---|---|
| 3,172,675 | A * | 3/1965 | Gonzalez | B25B 23/0035 279/2.23 |
| 4,750,750 | A * | 6/1988 | Batalorf, Jr. | B25B 21/007 279/144 |
| 5,226,762 | A * | 7/1993 | Ecker | B23B 51/0473 408/204 |
| 5,282,638 | A * | 2/1994 | Harper | B25B 21/007 279/144 |
| 6,799,919 | B2 * | 10/2004 | Reynertson, Jr. | B25B 23/0035 279/2.12 |
| 8,162,581 | B2 * | 4/2012 | Soltis | B23B 31/1071 411/347 |
| 8,220,804 | B2 * | 7/2012 | Erickson | B23B 31/06 279/2.11 |
| 2004/0161313 | A1 | 8/2004 | Nordlin | |
| 2007/0160434 | A1 | 7/2007 | Gillissen | |
| 2009/0252567 | A1 | 10/2009 | Gillissen | |
| 2016/0279717 | A1 * | 9/2016 | Batho | B23B 51/0473 |

FOREIGN PATENT DOCUMENTS

| | | | | |
|---|---|---|---|---|
| DE | 102015225918 | B3 * | 5/2017 | ......... B23B 31/1071 |
| EP | 1555076 | A1 | 7/2005 | |
| EP | 1827741 | A1 | 9/2007 | |
| EP | 2236230 | A2 | 10/2010 | |

OTHER PUBLICATIONS

Written Opinion of the International Searching Authority PCT/ISA/237 for International Application No. PCT/NL2015/050779 dated Mar. 23, 2016.

* cited by examiner

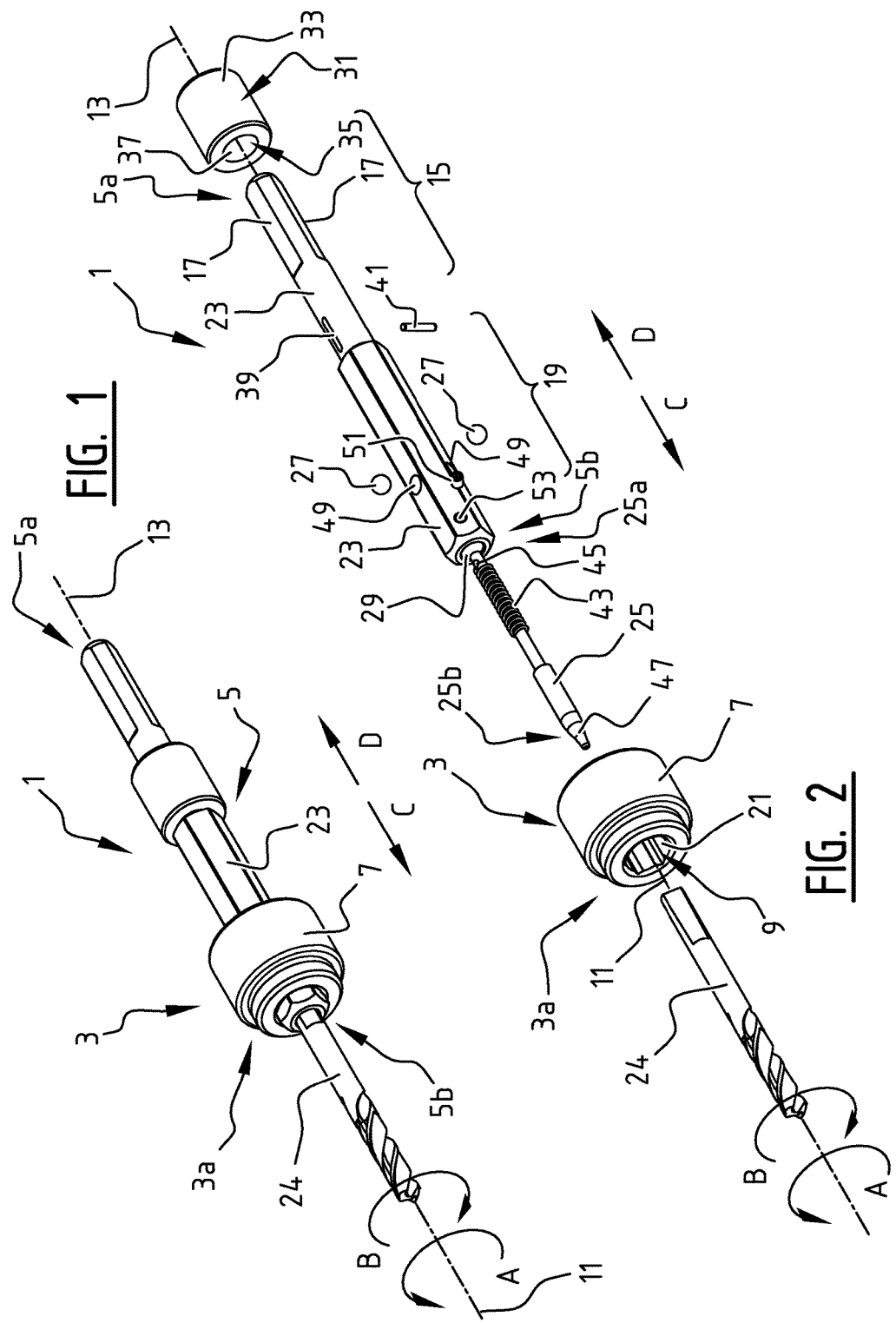

SYSTEM FOR RELEASABLE COUPLING OF A HOLE SAW TO A DRILL ARBOR

The present invention relates to a system for releasable coupling of a hole saw to a drill arbor.

Such a system is for instance known from the publications EP1555076 and EP1827741.

These known systems both have a drill arbor and a hole saw adapter. The drill arbor can be clamped at one end in a drill chuck of a drill and is optionally provided at the other end with a pilot drill. The hole saw adapter is configured for arranging a hole saw thereon and is provided with a through-hole through which the drill arbor can be inserted. The hole saw adapter can be moved along the drill arbor and can be coupled releasably thereto. With the hole saw adapter and a hole saw arranged thereon coupled to the drill arbor and with the drill arbor clamped in the drill chuck of a drill a hole can be drilled by means of the hole saw. The hole saw adapter with the hole saw arranged thereon can be removed from the drill arbor by uncoupling the hole saw adapter from the drill arbor and moving the hole saw adapter away from the drill along the drill arbor, after which another hole saw adapter with another hole saw thereon can be pushed onto the drill arbor. These known systems thus provide a quick-change function for hole saws. Uncoupling the hole saw adapter from the drill arbor after a hole has been drilled and moving the hole saw adapter with the hole saw arranged thereon along the drill arbor toward the drill enables a plug sawn out with the hole saw to be pressed out of the hole saw. These known systems thus also provide a plug ejecting function for hole saws. Uncoupling the hole saw adapter from the drill arbor and moving the hole saw adapter with the hole saw arranged thereon along the drill arbor toward the drill before drilling of a hole makes it possible to allow the pilot drill of the two systems to protrude far in front of the hole saw, so that a hole can be sawn at an extreme angle.

The system described in EP1827741 is the most versatile system of the two known systems. Uncoupling the hole saw adapter from the drill arbor before a hole is drilled and moving the hole saw adapter with the hole saw arranged thereon along the drill arbor toward the drill and sliding onto the drill arbor a second hole saw adapter having thereon a hole saw of smaller diameter than the hole saw on the first adapter makes it possible to enlarge a hole, wherein the hole saw with the smaller diameter serves as centering drill and the hole saw with the larger diameter saws the larger hole. The first hole saw adapter having thereon the hole saw with the larger diameter supports here on the drill chuck in which the drill arbor is clamped.

In order to releasably couple the hole saw adapter and the drill arbor to each other the said systems are provided with a pivoting latch which falls into a recess co-acting therewith in order to couple the hole saw adapter and the drill arbor. In the system as described in EP1827741 the latch is arranged pivotally in a transverse notch in the hole saw adapter and the recess co-acting therewith is a transverse notch in the drill arbor. The pivoting latch makes the hole saw adapter relatively costly compared to the drill arbor. When this system is used as quick-change system wherein a single drill arbor is used and a plurality of hole saws, this is disadvantageous since in order to enable quick change each hole saw has to be provided with a relatively costly hole saw adapter.

In the system as described in EP1555076 the latch is arranged pivotally in a longitudinal groove in the drill arbor and the recess co-acting therewith is a longitudinal groove in the hole saw adapter. Because the pivoting latch is situated in this system on the drill arbor, this system has the advantage that the hole saw adapter is relatively inexpensive. This system has the drawback however that, in order to arrange the latch pivotally in a longitudinal groove in the drill arbor, the part of the drill arbor in which the longitudinal groove and the latch are arranged has a relatively large cross-section in order to realize the hinge and to compensate for the weakening of the drill arbor as a result of the longitudinal groove. The relatively large cross-section makes this system unsuitable for hole saws of a relatively small diameter.

In addition, it is the case for both said known systems that the pivoting latch is vulnerable and that sawdust can easily enter the groove in which the latch is pivotally arranged, so that the groove may become clogged and the latch becomes less easy to operate or is even blocked. This has an adverse effect on the reliability of the two systems during use. For a pivoting movement of the latch in the groove a relatively great lateral clearance is moreover required between the latch and the groove. This clearance results in a clearance in the coupling between the hole saw adapter and the arbor, which has an adverse effect on the precision of a hole sawn using these known systems. This clearance in the coupling between the hole saw adapter and the arbor can also result in the latch being forced out of the recess during use and the coupling thereby being unintentionally released.

The present invention has for its object, among others, to provide an alternative system for releasable coupling of a hole saw to a drill arbor.

The system according to the invention comprises for this purpose:
- an elongate drill arbor configured at a first end to be clamped in a drill chuck of a drill; and
- a hole saw adapter provided with a longitudinal bore in which the drill arbor can be received so that an inner surface of the longitudinal bore of the hole saw adapter is mounted slidably on an outer surface of the drill arbor in the longitudinal direction of the drill arbor;

wherein
the drill arbor comprises an actuator member and at least one retaining element co-acting therewith, wherein:
  the actuator member is received slidably in a longitudinal bore of the drill arbor and is slidable in longitudinal direction of the drill arbor by means of an operating element;
  the retaining element is received in a transverse bore in the longitudinal wall of the longitudinal bore of the drill arbor and is movable in transverse direction of the drill arbor; and
  the actuator member is slidable between a first position and a second position,
wherein:
the retaining element is moved outward in transverse direction of the drill arbor by the actuator member when the actuator member slides from the first position to the second position, so that the retaining element protrudes partially from the outer surface of the drill arbor;
the actuator member blocks in the second position thereof an inward movement of the retaining element in transverse direction of the drill arbor; and
the actuator member allows in the first position thereof an inward movement of the retaining element in transverse direction of the drill arbor;
and wherein
the inner surface of the longitudinal bore of the hole saw adapter is provided with a recess into which the retaining element of the drill arbor can protrude.

In the system according to the invention the hole saw adapter can be coupled releasably to the drill arbor by sliding the actuator member into the first position by means of the operating element, inserting the drill arbor into the longitudinal bore of the hole saw adapter and displacing it slidably along the drill arbor such that the recess is aligned with the retaining element, and then sliding the actuator member to the second position thereof. The retaining element is then moved outward in transverse direction of the drill arbor so that the retaining element protrudes partially from the outer surface of the drill arbor and protrudes into the recess in the longitudinal bore of the hole saw adapter, so that a coupling is brought about between the hole saw adapter and the drill arbor. As long as the actuator member is in the second position a movement of the retaining element out of the recess is blocked so that the coupling realized by means of the retaining element protruding into the recess is maintained. By sliding the actuator member from the second position into the first position thereof a movement of the retaining element out of the recess is no longer blocked, so that the retaining element can move out of the recess and the coupling realized by means of the retaining element protruding into the recess is released. The hole saw adapter is preferably removable from the drill arbor by displacing the hole saw adapter, with the actuator member in the first position thereof, along the drill arbor away from the first end of the drill arbor. A hole saw arranged on the hole saw adapter can thus be removed from the drill arbor together with the hole saw adapter. Another hole saw can then be arranged on the drill arbor by means of a hole saw adapter arranged thereon by inserting the second end of the drill arbor remote from the first end into the longitudinal bore of the hole saw adapter and thus receiving the drill arbor in the longitudinal bore, and by coupling the hole saw adapter to the drill arbor as described above.

Because the moving parts of the system for effecting and releasing the coupling between the hole saw adapter and the drill arbor, i.e. the actuator member, the operating element and the retaining element, are situated on the drill arbor, the system according to the invention does not have the drawback of the hole saw adapter being relatively costly compared to the drill arbor.

Because the actuator member of the system according to the invention is received slidably in a longitudinal bore of the drill arbor, because no additional elements such as a hinge are required to enable the sliding movement and because the movement of the actuator member takes place in longitudinal direction of the drill arbor, the direction where most space is available, little space is necessary in cross-section of the drill arbor to accommodate the slidable actuator member. Because material is removed from the core of the drill arbor in order to form the longitudinal bore, the effect of forming of the longitudinal bore on the bending stiffness and torsion stiffness of the drill arbor is relatively small, so that only a small increase in the cross-sectional size of the drill arbor is necessary to compensate for the weakening resulting from forming of the longitudinal bore. Because the actuator member of the system according to the invention is received slidably in a longitudinal bore of the drill arbor, the mass of the actuator member can moreover be distributed around the central longitudinal axis of the drill arbor, and thereby around the rotation axis during drilling of a hole. This has the particular advantage relative to the above described known systems, in which the actuator members are positioned to one side outside the rotation axis during drilling of a hole, that a better rotational balance can be realized.

The combination of an actuator member which is moved in longitudinal direction and at least one retaining element which co-acts therewith and is moved in transverse direction has the additional advantage relative to both the above described known systems, wherein a retaining element and an actuator member are integrated into a single element, i.e. the latch, and as a result move together in the same direction, that the retaining element in the system according to the invention can be blocked in particularly effective manner so that there is less chance of unintentional release of the coupling between the drill arbor and the hole saw adapter. The actuator member being situated in a longitudinal bore of the drill arbor and the retaining element being situated in the longitudinal bore of the hole saw adapter during use moreover avoids sawdust obstructing sliding of the actuator member and movement of the retaining element in the system according to the invention.

In a preferred embodiment of the system according to the invention a plurality of retaining elements are distributed over the cross-sectional periphery of the drill arbor. This makes possible a balanced distribution over the retaining elements of the forces which have to be transmitted via the retaining elements of the hole saw to the drill arbor during drilling of a hole. Because the actuator member is received in a longitudinal bore of the drill arbor, the individual retaining elements can be operated simultaneously by means of a single actuator member. Although it is recommended that a plurality of retaining elements he provided, an effective coupling can also he realized with a single retaining element.

In an advantageous embodiment of the system according to the invention the actuator member is provided with at least one actuator surface with at least a part which, in the direction from the first position of the actuator member to the second position thereof, runs obliquely in the direction of the central longitudinal axis of the drill arbor and which comes into contact with the retaining element when the actuator member slides from the first position to the second position. With such an actuator surface with oblique part the sliding of the actuator member in the longitudinal direction of the drill arbor from the first position in the direction of the second position can be converted in simple manner to a movement of the retaining element in transverse direction of the drill arbor without the retaining element being connected to the actuator member. The oblique part of the actuator surface makes it possible here to eliminate any clearance between the actuator member, the retaining elements and the hole saw adapter.

The ratio of the path travelled by the actuator member in the longitudinal direction of the drill arbor when the actuator member slides between the first and second position and the path travelled by the retaining element in transverse direction of the drill arbor can be determined by means of the angle of the oblique part of the actuator surface relative to the central longitudinal axis of the actuator body, as can the effectiveness of the blocking of the retaining element in the second position of the actuator member. The smaller the angle, the greater the path travelled by the actuator member in the longitudinal direction of the drill arbor relative to the path travelled by the retaining element in transverse direction of the drill arbor. The smaller the angle, the greater the inward force which has to be exerted in transverse direction on the retaining element in order to press the actuator member out of the second position thereof and in the direction of the first position, and the more effective the blocking of the retaining element in the second position of the actuator member. Because in a preferred embodiment the angle of the oblique part increases gradually in longitudinal direction of the actuator member in the direction from the first position of the actuator member to the second position thereof, a relatively short path travelled by the actuator member between the first position and the second position thereof can be combined with a relatively effective blocking of the retaining element in the second position of the actuator member. In a preferred embodiment the actuator surface is located at an end of the actuator member. The actuator member can then be embodied in simple manner as a mandrel. In an alternative embodiment the actuator surface is located at a position between the two ends of the actuator member.

In an advantageous embodiment of the system according to the invention retaining elements are provided at different positions as seen in longitudinal direction of the drill arbor in order to make it possible to couple a hole saw adapter to the drill arbor at more than one position along the drill arbor. In this embodiment the actuator member preferably has actuator surfaces at different positions as seen in longitudinal direction thereof so that the retaining elements at the different positions along the drill arbor can be operated with a single actuator member.

In an advantageous embodiment of the system according to the invention the retaining element is a ball. A ball is particularly effective as retaining element and, because of its round shape, can be received in freely movable manner in a transverse bore of the drill arbor and can be operated in simple and reliable manner by an oblique surface. The retaining element can alternatively be a rod-like element with rounded ends which is received slidably in a transverse bore. In neither case is there a connection between the retaining element and the drill arbor. The retaining element can alternatively be connected to the drill arbor such that it is movable in transverse direction of the drill arbor, for instance by means of a pivoting or a flexible connection.

In an advantageous embodiment of the system according to the invention the operating element is positioned on the outer surface of the drill arbor and connected to the actuator member via a transverse bore in the longitudinal wall of the longitudinal bore of the drill arbor. The retaining element and the operating member are particularly positioned at a mutual distance in the longitudinal direction of the drill arbor. The transverse bore is particularly a slot extending in longitudinal direction of the drill arbor. An effective operation of the actuator member can thus be realized which is easily manufactured. The operating element preferably comprises a longitudinal bore in which the drill arbor can be received so that an inner surface of the longitudinal bore of the operating element is mounted slidably on an outer surface of the drill arbor in the longitudinal direction of the drill arbor.

In an advantageous embodiment of the system according to the invention the system comprises a spring element which engages on the actuator member and forces the actuator member in the direction of the second position thereof. Thus avoided is that, after coupling of the hole saw adapter to the drill arbor by means of the retaining element, the actuator member unintentionally moves from the second position, in which it blocks the retaining element, to the first position and that the retaining element moves out of the recess. In a preferred embodiment hereof the spring element is positioned in the longitudinal bore of the drill arbor.

In an embodiment of the system according to the invention the longitudinal bore of the hole saw adapter and the part of the drill arbor to he inserted into the longitudinal bore of the hole saw adapter have a corresponding cross-sectional shape which is other than round. A coupling is thus realized in effective manner between the drill arbor and the hole saw adapter which allows translation of the hole saw adapter relative to the drill arbor in the longitudinal direction of the drill arbor and blocks rotation of the hole saw adapter relative to the drill arbor around the central longitudinal axis thereof. In a preferred embodiment this shape is a hexagon, although other shapes which are other than round can likewise be applied.

The embodiment of the system according to the invention, wherein the longitudinal bore of the hole saw adapter and the part of the drill arbor to be inserted into the longitudinal bore of the hole saw adapter have a corresponding cross-sectional shape which is other than round, makes it possible that only a coupling need be brought about by means of the retaining element which blocks a translation of the hole saw adapter relative to the drill arbor in the longitudinal direction of the drill arbor. The recess in the inner surface of the longitudinal bore of the hole saw adapter can be formed in simple manner in this embodiment as a groove extending around the central longitudinal axis of the longitudinal bore of the hole saw adapter. A thus embodied hole saw adapter can be manufactured at particularly favourable cost. This groove is particularly bounded on two sides in longitudinal direction of the longitudinal bore of the hole saw adapter, so that by means of the retaining element protruding into the groove a coupling is brought about which blocks a translation of the hole saw adapter relative to the drill arbor in the longitudinal direction of the drill arbor.

For at least one retaining element the recess in the inner surface of the longitudinal bore of the hole saw adapter is alternatively bounded on two sides in peripheral direction of the longitudinal bore of the hole saw adapter. In addition to a coupling which blocks translation of the hole saw adapter relative to the drill arbor in the longitudinal direction of the drill arbor, with a thus embodied recess a coupling is also possible by means of the retaining element which blocks a rotation of the hole saw adapter relative to the drill arbor around the central longitudinal axis thereof. The longitudinal bore of the hole saw adapter and the part of the drill arbor to be inserted into the longitudinal bore of the hole saw adapter can then be of round cross-section.

In an embodiment of the system according to the invention the longitudinal bore of the hole saw adapter is a continuous longitudinal bore. This makes it possible to insert the drill arbor through the hole saw adapter. This enables a pilot drill to be arranged on the second end of the drill arbor.

With the system according to the invention, in which the hole saw adapter has a continuous longitudinal bore, a preferred embodiment is moreover possible wherein the shape and dimensions of the drill arbor in the part of the drill arbor to he inserted into the longitudinal bore of the hole saw adapter are of constant cross-section over a portion of the length of the drill arbor such that, with the actuator member in the first position thereof, the hole saw adapter can be displaced along the drill arbor beyond the retaining element in the direction of the first end of the drill arbor.

With this preferred embodiment, following sawing of a hole and following sliding of the actuator member from the second position to the first position, it is possible by displacing the hole saw adapter over the drill arbor in the direction of the first end of the drill arbor to press a plug out of the hole saw arranged on the hole saw adapter using the second end of the drill arbor or a pilot drill arranged thereon. When a pilot drill is arranged on the second end of the drill arbor, the diameter thereof is preferably smaller than the diameter of the drill arbor. When the hole saw adapter is displaced along the drill arbor in the direction of the drill chuck, the plug then abuts the second end of the drill arbor and is pushed out of the hole saw by the second end of the drill arbor, after which the plug can be removed from the pilot drill.

With the preferred embodiment of the system according to the invention, wherein with the actuator member in the first position thereof the hole saw adapter is displaceable along the drill arbor beyond the retaining element in the direction of the first end of the drill arbor, it is also possible before drilling a hole to uncouple the hole saw adapter from the drill arbor, to move the hole saw adapter with the hole saw arranged thereon along the drill arbor toward the drill, and to slide onto the drill arbor a second hole saw adapter having thereon a hole saw of smaller diameter than the hole saw on the first adapter. The second hole saw adapter can then abut against the first hole saw adapter, wherein the second hole saw of smaller diameter protrudes in front of the hole saw of larger diameter. The system according to the invention can thus be used to enlarge a hole.

In the case a pilot drill is arranged on the second end of the drill arbor, with this preferred embodiment it is also possible before drilling a hole to uncouple the hole saw adapter from the drill arbor and to move the hole saw adapter with the hole saw arranged thereon along the drill arbor toward the drill, so that a hole can be sawn at an extreme angle.

In the case of the hole enlargement and the case of sawing at an extreme angle the hole saw adapter slid in the direction of the drill can support against the operating element during drilling when this element is arranged on the outer surface of the drill arbor. The operating element preferably has the above described embodiment here wherein the operating element has a longitudinal bore in which the drill arbor can be received so that an inner surface of the longitudinal bore of the operating element is mounted slidably on an outer surface of the drill arbor in the longitudinal direction of the drill arbor. The hole saw adapter is then supported uniformly all the way around. A circlip, against which the hole saw adapter slid in the direction of the drill supports during hole enlargement and sawing at extreme angle, can alternatively be arranged on the drill arbor in front of the operating element as seen in the direction from the second end toward the first end. Because the hole saw adapter slid in the direction of the drill does not then support against the operating element, it remains possible to control the operating element and the second hole saw adapter can be coupled by means of the retaining elements to the drill arbor during hole enlargement. In the case retaining elements are provided at more than one position as seen in longitudinal direction of the drill arbor, the hole saw adapter slid in the direction of the drill can be coupled to the drill arbor during hole enlargement and during sawing at extreme angle by means of one or more retaining elements located at a position closer to the drill. Because the hole saw adapter slid in the direction of the drill does not support against the operating element either in this case, it remains possible to control the operating element and the second hole saw adapter can be coupled to the drill arbor during hole enlargement by means of one or more retaining elements located at a position further away from the drill.

In a preferred embodiment the part of the drill arbor to be inserted into the longitudinal bore of the hole saw adapter extends from the second end of the drill arbor in the direction of the first end of the drill arbor. These measures make it possible for the drill arbor to be inserted into and removed from the longitudinal bore of the hole saw adapter without taking the first end of the drill arbor out of the drill chuck of the drill, so that quick change of hole saws is possible. As an alternative to the embodiment wherein the longitudinal bore of the hole saw adapter is a continuous longitudinal bore, it is possible in this embodiment for the longitudinal bore to be a blind bore. Quick change is then possible, although plug ejection, hole enlargement and sawing at extreme angle are not.

In a preferred embodiment of the system according to the invention the hole saw adapter is configured for arranging a hole saw thereon, or the hole saw adapter is integrated into a hole saw. The hole saw adapter together with a hole saw arranged thereon or the hole saw with the hole saw adapter integrated therein is preferably removable from the drill arbor by displacing the hole saw adapter together with a hole saw arranged thereon or the hole saw with the hole saw adapter integrated therein, with the actuator member in the first position thereof, along the drill arbor away from the first end of the drill arbor.

In a preferred embodiment of the system according to the invention the system comprises a plurality of hole saw adapters, each arranged on or integrated into a respective hole saw.

The present invention also relates to an elongate drill arbor configured at a first end to be clamped in a drill chuck of a drill, comprising an actuator member and at least one retaining element co-acting therewith, wherein:

- the actuator member is received slidably in a longitudinal bore of the drill arbor and is slidable in longitudinal direction of the drill arbor by means of an operating element;
- the retaining element is received in transverse bores in the longitudinal wall of the longitudinal bore of the drill arbor and is movable in transverse direction of the drill arbor; and
- the actuator member is slidable between a first position and a second position, wherein:

- the retaining element is moved outward in transverse direction of the drill arbor by the actuator member when the actuator member slides from the first position to the second position, so that the retaining element protrudes partially from the outer surface of the drill arbor;
- the actuator member blocks in the second position thereof an inward movement of the retaining element in transverse direction of the drill arbor; and
- the actuator member allows in the first position thereof an inward movement of the retaining element in transverse direction of the drill arbor.

The present invention also relates to a hole saw adapter for such a drill arbor, wherein the hole saw adapter is provided with a longitudinal bore in which the drill arbor can be received so that an inner surface of the longitudinal bore of the hole saw adapter is mounted slidably on an outer surface of the drill arbor in the longitudinal direction of the drill arbor, and wherein the inner surface of the longitudinal bore of the hole saw adapter is provided with a recess into which the retaining element of the drill arbor can protrude.

Further advantages, features and details of the present invention will be elucidated on the basis of the following description, wherein reference is made to the accompanying drawing in which an embodiment of the system according to the invention is shown schematically.

In the drawing:

FIG. 1 is a perspective view of a preferred embodiment of a system according to the invention with a drill arbor and a hole saw adapter on which a hole saw has not yet been arranged;

FIG. 2 is a perspective view of the system of FIG. 1 with exploded parts;

Figure 3:
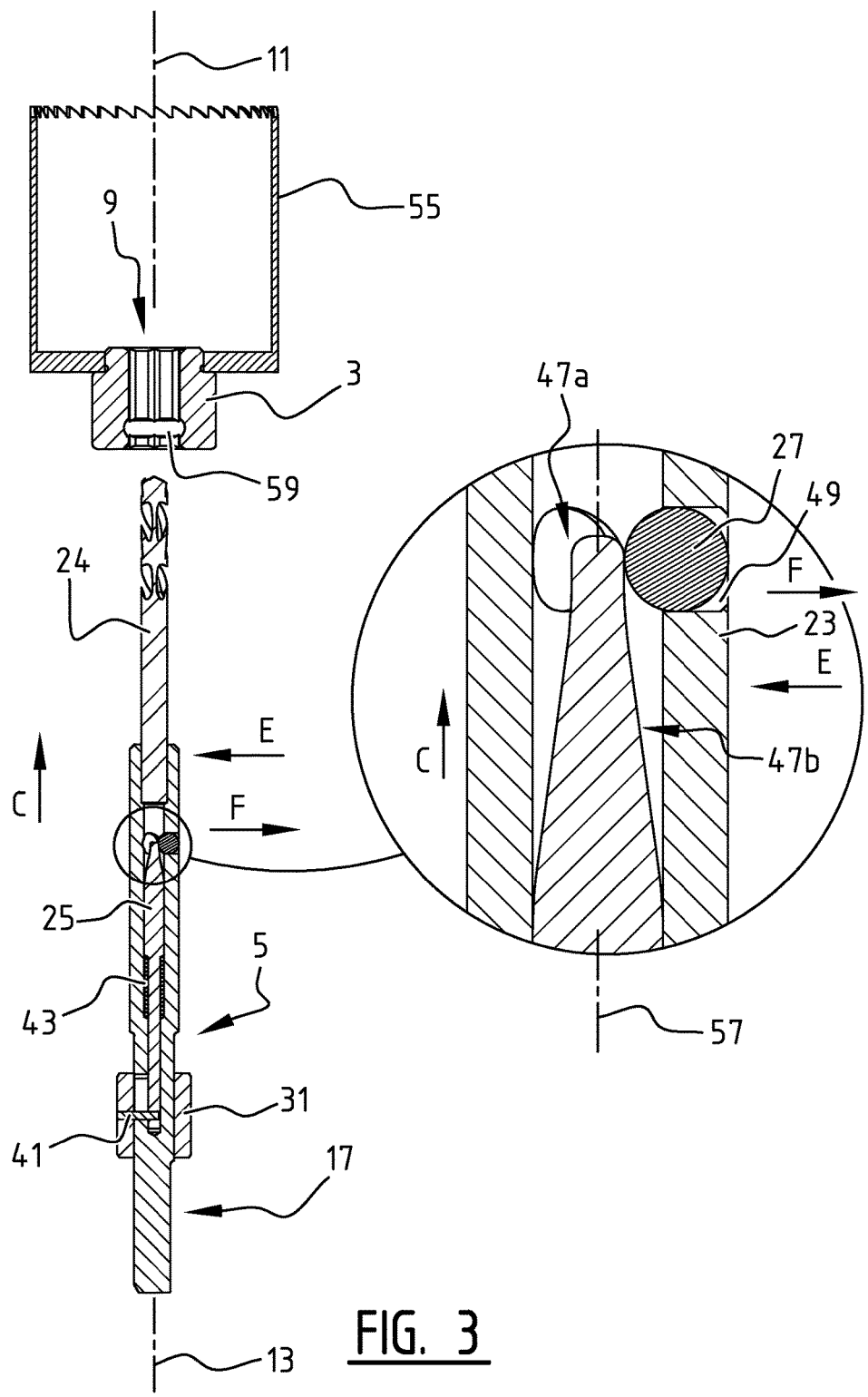
FIGS. 3-5 show a view in longitudinal section of the system of FIGS. 1 and 2, wherein a pilot drill is arranged on the drill arbor and a hole saw on the hole saw adapter, wherein the drill arbor and the hole saw adapter are shown at different positions relative to each other in order to illustrate the operation of the system.

FIGS. 1 and 2 show a system 1 according to the invention for releasable coupling of a hole saw to a drill arbor. System 1 is shown with a hole saw adapter 3 and a drill arbor 5.

Hole saw adapter 3 has an adapter body 7 with a longitudinal bore 9 therein. Longitudinal bore 9 of hole saw adapter 3 has a central longitudinal axis 11 and has a hexagonal cross-sectional shape. Hole saw adapter 3 is configured at an end 3a for a hole saw to be arranged thereon. In the shown exemplary embodiment hole saw adapter 3 is provided at that end 3a with a screw thread onto which a hole saw can be screwed in known manner for arranging thereof on hole saw adapter 3. The hole saw adapter is alternatively integrated into a hole saw or provided with other per se known measures for arranging a hole saw thereon.

Drill arbor 5 is elongate and has a central longitudinal axis 13, and is configured at a first end 5a to be received in a drill chuck of a drill. Drill arbor 5 particularly has at first end 5a a first end part 15 which is embodied so as to be received in the drill chuck of a drill. In the shown exemplary embodiment the first end part 15 is of the type with three clamping surfaces 17, wherein the cross-sectional peripheral shape is a circular shape flattened at three positions. A drill arbor with such a type of end part is referred to as a TRIANGLE shank. Alternative embodiments of the first end part to be received in the drill chuck of a drill are known as HEX, SDS, SDS-PLUS, STRAIGHT shank. Drill arbor 5 has on the second end 5b a second end part 19 which is embodied so as to be received in longitudinal bore 9 of hole saw adapter 3, wherein inner surface 21 of longitudinal bore 9 of hole saw adapter 3 is mounted slidably on outer surface 23 of drill arbor 5 in the longitudinal direction of drill arbor 5. The second end part 19 of drill arbor 5 has for this purpose a cross-sectional shape corresponding to the cross-sectional shape of longitudinal bore 9 of hole saw adapter 3, in particular a hexagon. A pilot drill 24 is arranged at second end 5b of drill arbor 5.

FIG. 1 shows a situation wherein drill arbor 5 is received in longitudinal bore 9 of hole saw adapter 3. Longitudinal bore 9 of hole saw adapter 3 is a through-bore so that, as shown in FIG. 1, drill arbor 5 can protrude through hole saw adapter 3. In the situation as shown in FIG. 1, in which inner surface 21 of longitudinal bore 9 of hole saw adapter 3 is mounted slidably on outer surface 23 of drill arbor 5 in the longitudinal direction of drill arbor 5, the central longitudinal axis 11 of hole saw adapter 3 and the central longitudinal axis 13 of drill arbor 5 coincide. Because the cross-sectional shapes of second end part 15 of drill arbor 5 and longitudinal bore 9 of hole saw adapter 3 are other than round, in the situation shown in FIG. 1 hole saw adapter 3 and drill arbor 5 are coupled in rotation directions A and B around the respective central longitudinal axes 11 and 13 such that a rotation of hole saw adapter 3 and drill arbor 5 relative to each other in these rotation directions A and B is blocked.

In the situation as shown in FIG. 1 hole saw adapter 3 and drill arbor 5 are additionally coupled such that a translation of hole saw adapter 3 and drill arbor 5 relative to each other in the longitudinal directions C and D parallel to the respective central longitudinal axes 11, 13 is blocked. The drill arbor is provided for this purpose with an actuator member 25 in the form of a mandrel and three retaining elements 27 in the form of balls co-acting therewith. Two retaining elements 27 are shown in FIG. 2. The third retaining element lies behind drill arbor 5 in FIG. 2. Actuator member 25 is received slidably in a longitudinal bore 29 of drill arbor 5 and is slidable in longitudinal bore 29 of drill arbor 5 in longitudinal directions C and D of drill arbor 5 by means of an operating element 31. Operating element 31 has a bush-like body 33 with a continuous longitudinal bore 35. The first end part 15 of drill arbor 5 can be received in longitudinal bore 35 of operating element 31, wherein inner surface 37 of longitudinal bore 35 of operating element 31 is mounted slidably in the longitudinal direction of drill arbor 5 on outer surface 23 of drill arbor 5 in first end part 15 thereof. Operating element 31 is thus positioned on outer surface 23 of drill arbor 5. Operating element 31 is connected to actuator member 25 via a transverse bore 39 in the longitudinal wall of longitudinal bore 29 of drill arbor 5 by means of a connecting pin 41. In the shown exemplary embodiment transverse bore 39 is a slot extending in longitudinal direction of drill arbor 5. A spring element 43 is arranged on actuator member 25. Actuator member 25 with spring element 43 arranged thereon can be inserted in the longitudinal direction D into longitudinal bore 29 of the drill arbor in order to place actuator member 25 in longitudinal bore 29. Longitudinal bore 29 of drill arbor 5 is open at second end 5a thereof for this purpose. Actuator member 25 is provided at a first end 25a with a transverse bore 45 in which connecting pin 41 is arranged in order to connect operating element 31 to actuator member 25. Actuator member 25 is provided at second end 25b with an actuator surface 47 which co-acts with the retaining elements 27 in the form of balls. Retaining elements 27 are received in transverse bores 49 in the longitudinal wall of longitudinal bore 29 of drill arbor 5 and are movable in transverse bores 49 in transverse direction of drill arbor 5. Pilot drill 25 is inserted into the opening of longitudinal bore 29 of drill arbor 5 at second end 5a thereof and is held fixedly therein by means of clamping screw 51 which engages on pilot drill 25 through a transverse bore 53 in the longitudinal wall in order to clamp pilot drill 25 fixedly in longitudinal bore 29 of drill arbor 5.

Actuator member 25 is slidable in longitudinal direction of drill arbor 5 between a first position and a second position using operating element 31. The retaining elements 27 co-acting with actuator member 25 can be operated by sliding actuator member 25 between the first position and the second position. This operation of retaining elements 27 and the function thereof in the system will be elucidated below with reference to FIGS. 3-5, in which the system of FIGS. 1 and 2 is shown in longitudinal section. In these figures a hole saw 55 is arranged on hole saw adapter 3.

In FIG. 3 hole saw adapter 3 with hole saw 55 arranged thereon is shown separately of drill arbor 5. In the situation shown in FIG. 3 actuator member 25 is in the first position. As shown in the detail view in FIG. 3, in this first position actuator member 25 allows retaining elements 27 to be positioned so far inward in transverse bores 49 that they do not protrude from transverse bores 49 outside outer surface 23 of the drill arbor. In the shown first position of actuator member 25 retaining elements 27 are in contact with a first part 47a of the actuator surface which is substantially parallel to central longitudinal axis 57 of actuator member 25. The retaining elements 27 in the form of balls are freely movable in transverse bores 49. Retaining elements 27 are prevented from moving out of transverse bores 49 in transverse direction E by means of this first part 47a of the actuator surface. Retaining elements 27 are prevented from moving out of transverse bores 49 in transverse direction F by means of a narrowed portion in transverse bores 49 close to outer surface 23 of drill arbor 5.

With actuator member 25 in this first position and with retaining elements 27 positioned so far inward in transverse bores 49 that they do not protrude from transverse bores 49 outside outer surface 23 of the drill arbor, drill arbor 5 can be inserted into longitudinal bore 9 of hole saw adapter 3 and hole saw adapter 3 can be moved freely in longitudinal direction over second part 19 of drill arbor 5. When actuator member 25 slides in the longitudinal direction C, retaining elements 27 come into contact with a second part 47b of actuator member 25 which runs at an angle relative to central longitudinal axis 57 of actuator member 25. When actuator member 25 slides further in longitudinal direction C, retaining elements 27 are moved outward in transverse direction F so that retaining elements 27 protrude partially out of outer surface 23 of drill arbor 5, as shown in the detail view in FIG. 4. As shown in FIG. 3, the inner surface of longitudinal bore 9 of hole saw adapter 3 is provided with a groove 59 extending around the central longitudinal axis 11 of longitudinal bore 9 of hole saw adapter 3. This groove 59 is bounded on two sides in longitudinal direction of longitudinal bore 9 of hole saw adapter 3. This groove 59 forms a recess into which retaining elements 27 can protrude when, as shown in FIG. 3, hole saw adapter 3 is positioned along drill arbor 5 such that groove 59 is aligned with retaining elements 27. By moving drill arbor 5 from the situation shown in FIG. 3 into longitudinal bore 9 of hole saw adapter 3, positioning the arbor such that groove 59 is aligned with retaining elements 27 and then sliding actuator member 25 from the first position in longitudinal direction C, retaining elements 27 move in transverse direction F to a position outside outer surface 23 of drill arbor 5 and thus protrude into groove 59. This results in the situation as shown in FIG. 4.

Figure 4:
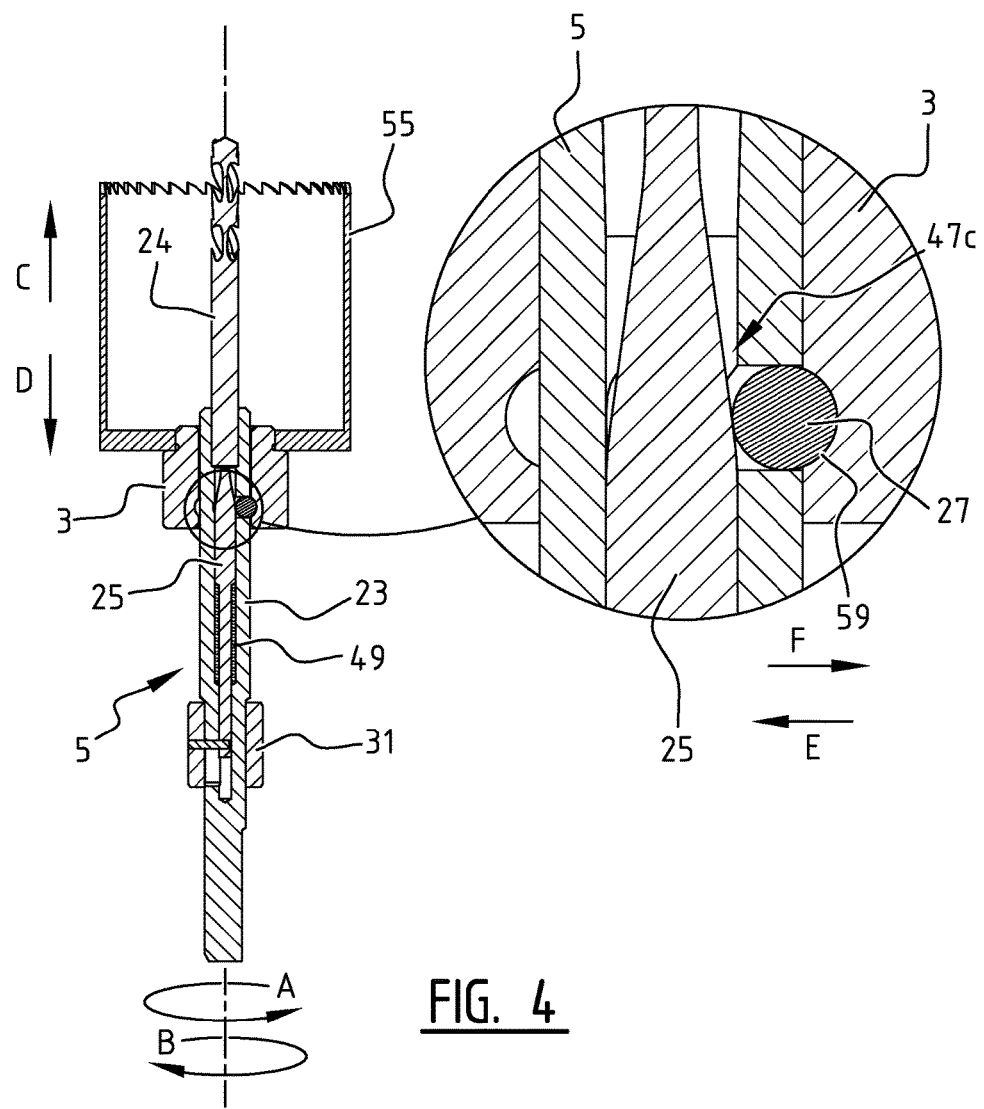

In FIG. 4 actuator member 25 is in the second position thereof. As shown in the detail view in FIG. 4, in this second position of actuator member 25 retaining elements 27 are in contact with a third part 47c of the actuator surface. This third part 47c runs at less of an angle relative to central longitudinal axis 57 of actuator member 25, so avoiding that the retaining elements 27 slide actuator member 25 in the direction of the first position thereof and as a result move inward in transverse direction E and move out of groove 59 when hole saw 55 and drill arbor 5 are loaded in longitudinal direction during sawing of a hole. Spring element 43 forces actuator member 25 in the direction of the second position thereof, so additionally avoiding that actuator member 25 unintentionally slides in the direction of the first position thereof. In the second position actuator member 25 thus blocks an inward movement of retaining elements 27 in transverse direction of drill arbor 5.

Although actuator surface 47 is shown with three portions with different angles relative to central longitudinal axis 57 of actuator member 25, actuator surface 47 can also take a different form, for instance without first part 47a. Second part 47b can then be in contact with retaining elements 27 when actuator member 25 is in the first position thereof so as to avoid retaining elements 27 moving out of transverse bores 49 in transverse direction E.

Because groove 59 is bounded on two sides in longitudinal direction, as long as retaining elements 27 protrude into groove 59 a coupling is realized between hole saw adapter 3 and drill arbor 5 whereby in the situation shown in FIG. 4 a translation of hole saw adapter 3 and drill arbor 5 relative to each other is blocked in longitudinal directions C and D of drill arbor 5. Because as described above the cross-sectional shapes of the second end part 15 of drill arbor 5 and longitudinal bore 9 of hole saw adapter 3 are other than round, hole saw adapter 3 and drill arbor 5 are coupled in rotation directions A and B around the respective central longitudinal axes 11 and 13 such that a rotation of hole saw adapter 3 and drill arbor 5 relative to each other is blocked in these rotation directions A and B. A translation of hole saw adapter 3 and drill arbor 5 relative to each other along central longitudinal axes 11, 13 and a rotation of hole saw adapter 3 and drill arbor 5 relative to each other around central longitudinal axes 11, 13 are thus blocked in the situation shown in FIG. 4. In this situation the system is ready to drill a hole.

Sliding the actuator member 25 in the situation shown in FIG. 4 from the second position thereof into the first position in longitudinal direction D counter to the action of spring element 43 by means of operating element 31 has the result that actuator member 25 no longer blocks an inward movement of retaining elements 27 in transverse direction of drill arbor 5 in transverse direction E. When hole saw adapter 3 is displaced along drill arbor 5 in longitudinal direction C or D with actuator member 25 in the first position, retaining elements 27 are moved inward in transverse direction E and thus move out of groove 59. The situation as shown in FIG. 3 can be realized by displacing hole saw adapter 3 along drill arbor 5 in longitudinal direction C. From this situation another hole saw adapter of the same form with a different hole saw thereon can be coupled to drill arbor 5. A quick change of hole saws is thus possible with the system.

Figure 5:
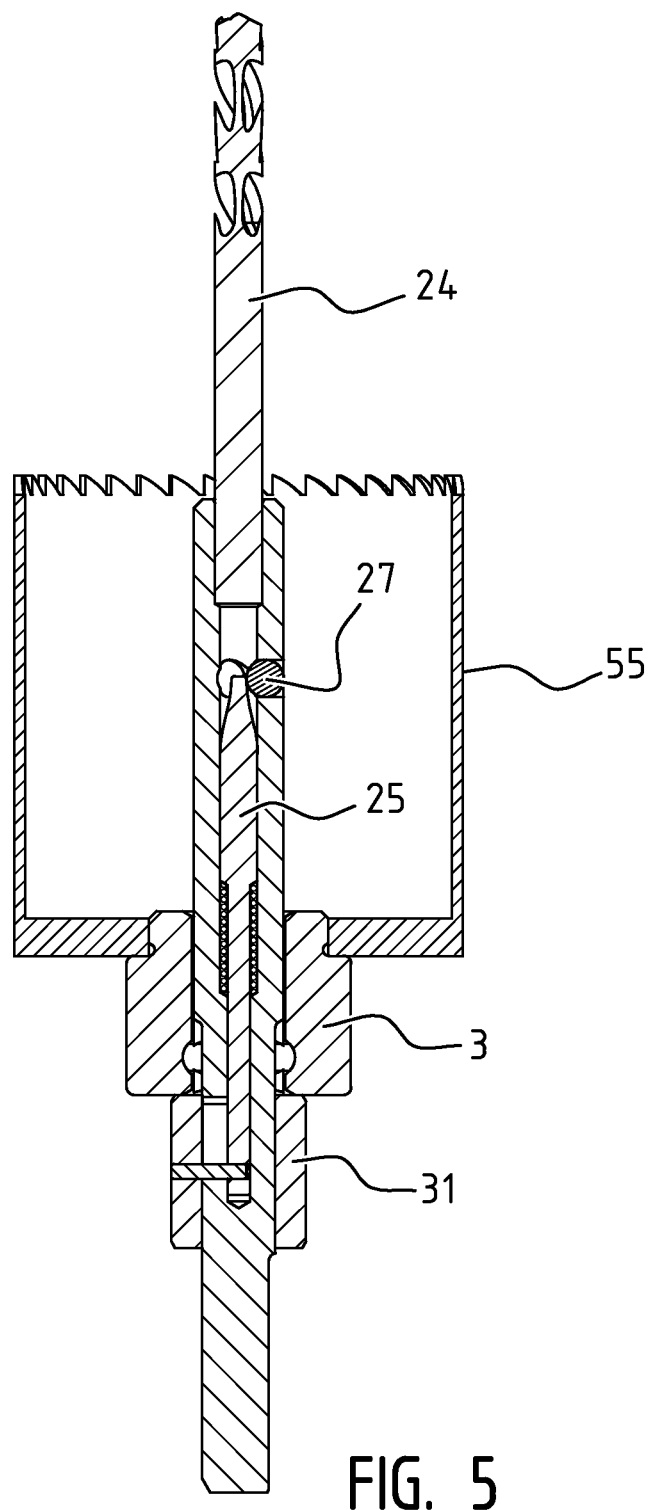

The situation as shown in FIG. 5 can be realized by displacing hole saw adapter 3 along drill arbor 5 in longitudinal direction D in the situation as shown in FIG. 4 following sliding of actuator member 25 in longitudinal direction D from the second position into the first position. With hole saw adapter 3 in the shown position a hole can be drilled at an extreme angle, i.e. wherein the central longitudinal axis 13 of drill arbor 5 intersects the surface into which a hole has to be drilled at a relatively small angle. Hole saw adapter 3 then supports on operating element 31 during drilling. A circlip, against which the hole saw adapter slid in the direction of the drill supports, can alternatively be arranged on the drill arbor in front of the operating element as seen in the direction from the second end toward the first end.

With the displacement of the hole saw adapter along drill arbor 5 in longitudinal direction D from the position as shown in FIG. 4 to the position shown in FIG. 5 it is also possible to press a plug sawn out by means of hole saw 55 out of the hole saw. This is further explained below with reference to FIGS. 6 and 7.

Figures 6, 7:
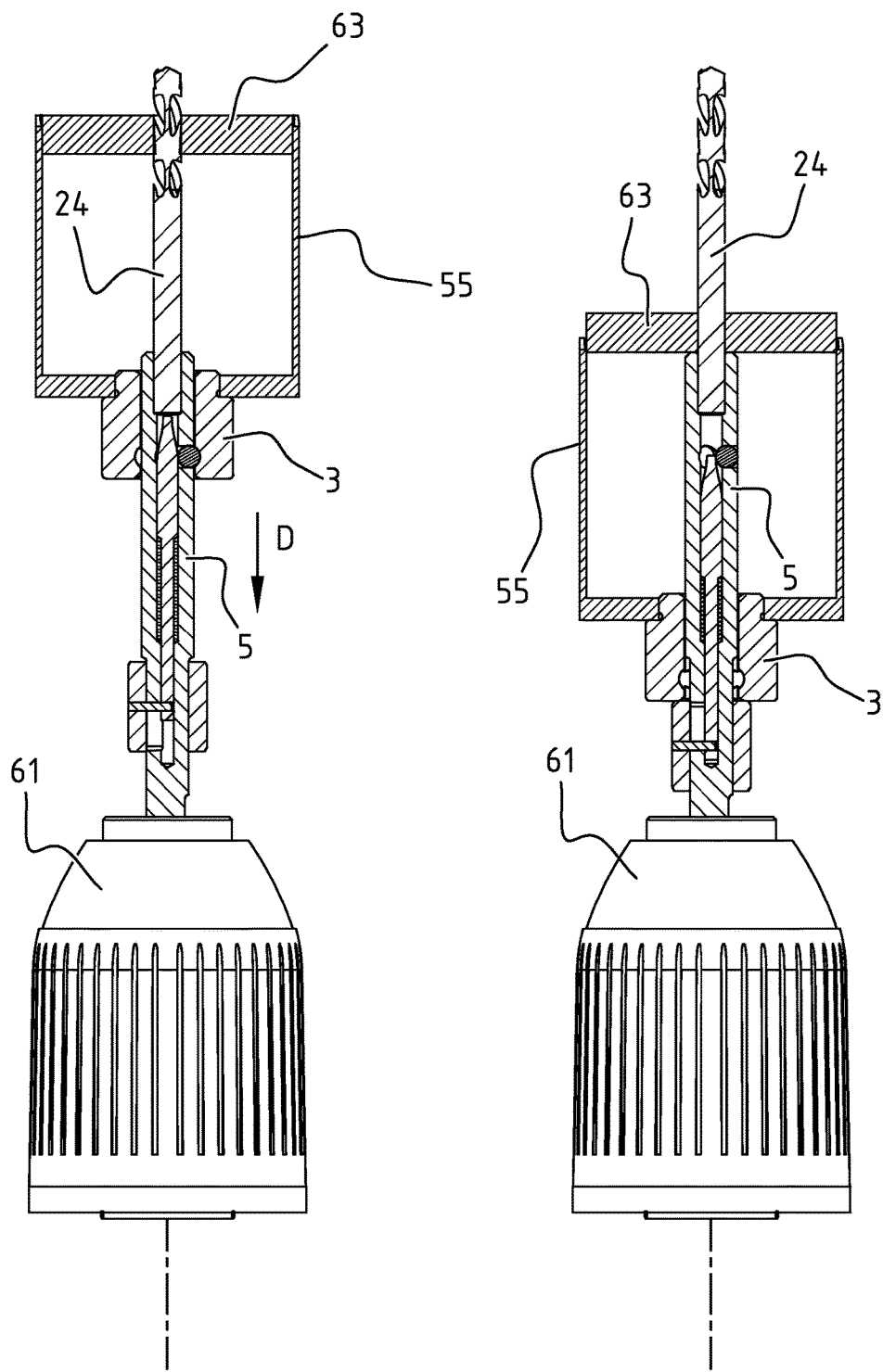
FIGS. 6 and 7 show a view in longitudinal section corresponding to the view of FIGS. 4 and 5 respectively, wherein the drill arbor is clamped at a first end thereof in a drill chuck of a drill, and a plug sawn out by means of the hole saw is situated in the hole saw in order to illustrate the plug ejecting function of the system according to the invention.

FIG. 6 shows the system in the situation of FIG. 4, albeit that the first end part of the drill arbor is received in a drill chuck 61 of a drill. As shown, a plug 63 in the form of a disc of sawn-out material is situated in hole saw 55. From the situation shown in FIG. 6, after sliding actuator member 25 from the second position into the first position, the situation as shown in FIG. 7 can be realized by displacing hole saw adapter 3, and thereby hole saw 55, along drill arbor 5 in longitudinal direction D. During displacement of hole saw adapter 3, and thereby hole saw 55, along drill arbor 5 in longitudinal direction D, plug 63 is displaced as shown along pilot drill 24 and comes into contact with drill arbor 5. Because drill arbor 5 has a greater cross-sectional diameter than pilot drill 24, plug 63 is pressed partially out of hole saw 55 during further displacement of hole saw adapter 3, and thereby hole saw 55, along drill arbor 5 in longitudinal direction D, and can be removed therefrom in simple manner Pressing a plug out of the hole saw is thus possible in simple manner with the system. When there is sufficient friction between pilot drill 24 and plug 63, plug 63 will be pressed out of hole saw 55 by pilot drill 24 when hole saw adapter 3, and thereby hole saw 55, are displaced along drill arbor 5 in longitudinal direction D.

Figure 8:
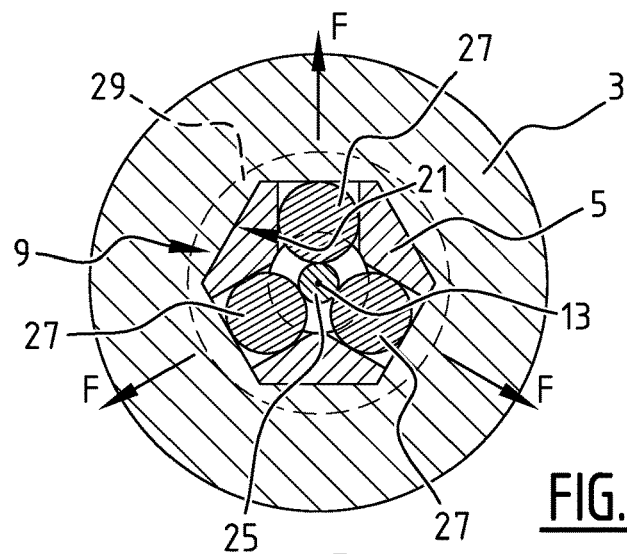
FIGS. 8-10 are cross-sectional views of the hole saw adapter and the drill arbor of the system of FIGS. 1 and 2.
Figure 9:
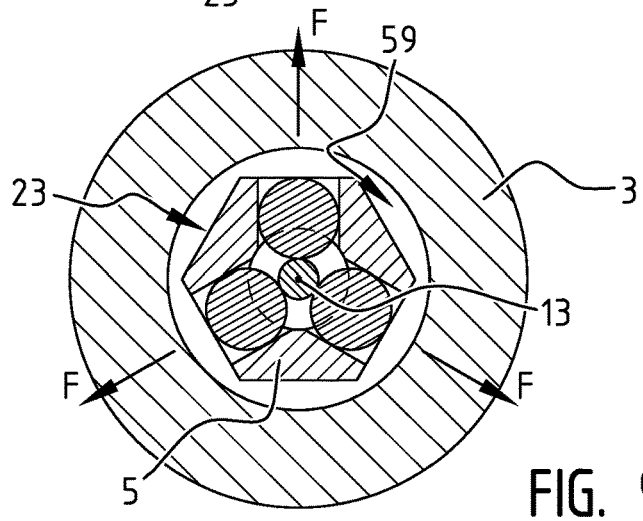
Figure 10:
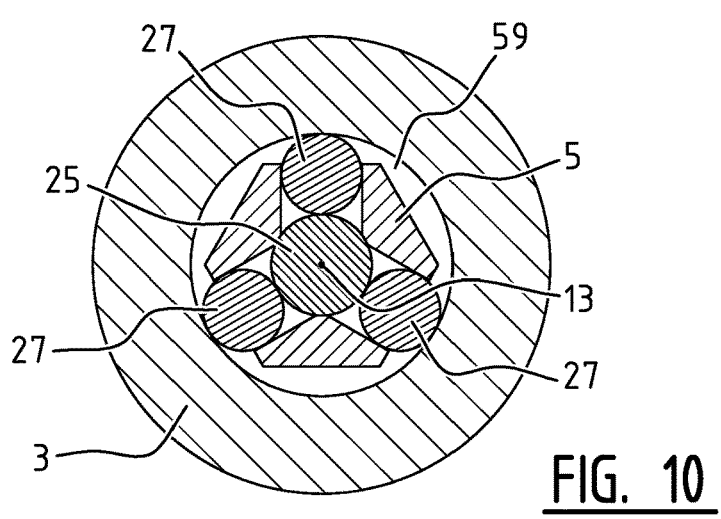
Figure 11:
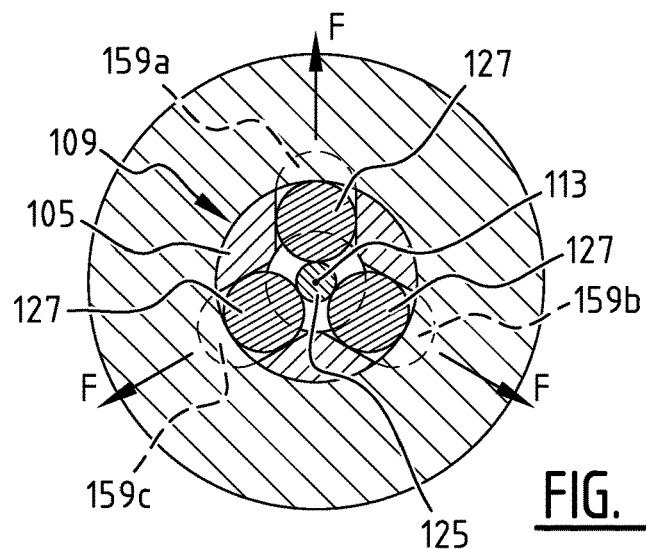
FIGS. 11-13 are cross-sectional views of an alternative embodiment of the hole saw adapter and the drill arbor of the system of FIGS. 1 and 2.
Figure 12:
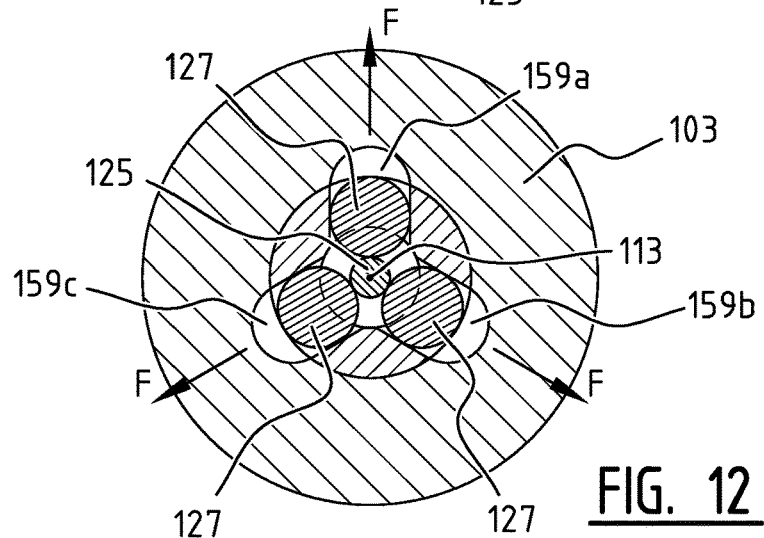
Figure 13:
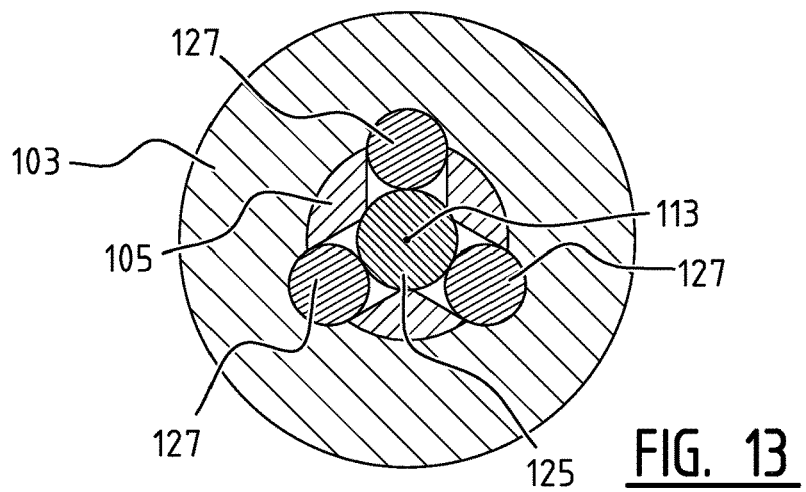

FIG. 8 shows a cross-section of hole saw adapter 3 of system 1 of FIGS. 1-7 just above groove 59 in the inner surface of the longitudinal bore 9. FIG. 9 shows hole saw adapter 3 of system 1 of FIGS. 1-7 in the same situation, but here in cross-section at the position of groove 59 in inner surface 21 of longitudinal bore 9. In the situation shown in FIGS. 8 and 9 drill arbor 5 has been inserted into longitudinal bore 9. Actuator member 25 is in the first position thereof. Retaining elements 27 do not protrude outside outer surface 23 of drill arbor 5 and do not therefore protrude into groove 59. As shown in FIG. 8, drill arbor 5 and longitudinal bore 9 of hole saw adapter 3 have a corresponding cross-sectional shape, in particular a hexagon. Because of this shape there is a form-closed coupling between drill arbor 5 and hole saw adapter 3 whereby rotation of hole saw adapter 3 relative to drill arbor 5 around central longitudinal axis 13 of drill arbor 5 is blocked. By sliding actuator member 25 from the situation shown in FIG. 8 into the second position thereof the three retaining elements 27 are moved simultaneously in transverse direction F by actuator member 25 so that the situation as shown in FIG. 10 is reached, in which the three retaining elements 27 protrude into groove 59. Groove 59 is bounded on two sides in longitudinal direction of longitudinal bore 9 of hole saw adapter 3. A form-closed coupling between drill arbor 5 and hole saw adapter 3 is then obtained by means of retaining elements 27, whereby translation of hole saw adapter 3 relative to drill arbor 5 along the central longitudinal axis 13 of drill arbor 5 is blocked, FIGS. 11-13 show the situation as shown in FIGS. 8-10 with alternative embodiments of the hole saw adapter and the drill arbor. Hole saw adapter 103 differs from hole saw adapter 3 in that it does not have one groove into which retaining elements 127 can protrude, but three individual recesses 159a, 159b and 159c in the inner surface of longitudinal bore 109. In addition, hole saw adapter 103 and drill arbor 105 differ from hole saw adapter 3 and drill arbor 5 in that drill arbor 105 and longitudinal bore 109 of hole saw adapter 103 have a corresponding round shape in cross-section instead of the shape of a hexagon.

FIG. 11 shows a cross-section of hole saw adapter 103 just above recesses 159a, 159b, 159c in the inner surface of longitudinal bore 109. FIG. 12 shows hole saw adapter 103 in the same situation, but here in cross-section at the position of recesses 159a, 159b, 159c in the inner surface of longitudinal bore 109. In the situation shown in FIGS. 11 and 12 drill arbor 105 has been inserted into longitudinal bore 109. Actuator member 125 is in the first position thereof. Retaining elements 127 to not protrude outside the outer surface of drill arbor 105 and do not therefore protrude into recesses 159a, 159b, 159c. As shown in FIG. 11, drill arbor 105 and longitudinal bore 109 of hole saw adapter 103 have a corresponding round shape in cross-section. Owing to this shape there is no coupling in this situation between drill arbor 105 and hole saw adapter 103, whereby rotation of hole saw adapter 3 relative to drill arbor 5 around central longitudinal axis 13 of drill arbor 5 is blocked. Nor is there in this situation a coupling between drill arbor 105 and hole saw adapter 103, whereby translation of hole saw adapter 103 relative to drill arbor 105 along central longitudinal axis 113 of drill arbor 105 is blocked. Such recesses can for instance be manufactured by drilling continuous holes from the outer surface of the hole saw adapter and partially closing these holes from the outer surface, or even leaving them open.

By sliding actuator member 125 into the second position thereof from the situation shown in FIGS. 11 and 12 the three retaining elements 127 are moved simultaneously in transverse direction F by actuator member 125 so that the situation as shown in FIG. 13 is reached, in which the three retaining elements 127 each protrude into an individual recess 159a, 159b, 159c. Recesses 159a, 159b, 159c are bounded on two sides both in longitudinal direction of hole saw adapter 103 and in peripheral direction of longitudinal bore 109. In the situation as shown in FIG. 13 a form-closed coupling between drill arbor 105 and hole saw adapter 103 is then obtained by means of retaining elements 127, whereby both rotation of hole saw adapter 103 relative to drill arbor 105 along central longitudinal axis 113 of drill arbor 105 and translation of hole saw adapter 103 relative to drill arbor 105 along central longitudinal axis 113 of drill arbor 105 are blocked.

In the embodiment of the system according to the invention as shown in FIGS. 1-7 retaining elements are provided at one position as seen in the longitudinal direction of the drill arbor, so that the hole saw adapter can be coupled to the drill arbor by means of retaining elements at one position as seen in the longitudinal direction of the drill arbor. Retaining elements are alternatively provided at different positions as seen in longitudinal direction of the drill arbor in order to enable coupling of a hole saw adapter to the drill arbor at more than one position along the drill arbor. In this embodiment the actuator member preferably has actuator surfaces at different positions as seen in longitudinal direction thereof in order to enable the retaining elements at the different positions along the drill arbor to be operated with a single actuator member.

The present invention is not limited to the above described preferred embodiments. The rights sought are defined by the following claims, within the scope of which many modifications can be envisaged.

The invention claimed is:

1. A system for releasable coupling of a hole saw to a drill arbor, comprising:
   a drill arbor including an elongate drill arbor body configured at a first end to be clamped in a drill chuck of a drill; and
   a hole saw adapter provided with a longitudinal bore into which the elongate drill arbor body is receivable so that an inner surface of the longitudinal bore of the hole saw adapter is slidably mounted on an outer surface of the elongate drill arbor body in a longitudinal direction of the elongate drill arbor body;
wherein
the hole saw adapter is configured for arranging a hole saw thereon, or
the hole saw adapter is integrated into a hole saw;
such that the hole saw adapter is slidable on the outer surface of the elongate drill arbor body in the longitudinal direction of the elongate drill arbor body together with a hole saw arranged thereon or with the hole saw with the hole saw adapter integrated therein;
the drill arbor including an actuator member and at least one retaining element co-acting therewith, wherein:
the actuator member is received slidably in a longitudinal bore of the elongate drill arbor body and is slidable in the longitudinal direction of the elongate drill arbor body by way of an operating element;
the at least one retaining element is receivable in a transverse bore in a longitudinal wall of the longitudinal bore of the elongate drill arbor body and is movable in transverse direction of the elongate drill arbor body; and
the actuator member is slidable between a first position and a second position,
the at least one retaining element is movable outward in a transverse direction of the elongate drill arbor body by the actuator member in response to the actuator member sliding from the first position to the second position, so that the at least one retaining element protrudes partially from the outer surface of the elongate drill arbor body;
the actuator member is configured to block in the second position thereof an inward movement of the at least one retaining element in transverse direction of the elongate drill arbor body; and
the actuator member is configured to allow in the first position thereof an inward movement of the at least one retaining element in transverse direction of the elongate drill arbor body;
and wherein
the inner surface of the longitudinal bore of the hole saw adapter is provided with a recess into which the at least one retaining element of the drill arbor is adapted to protrude.

2. The system of claim 1, wherein
a plurality of retaining elements are distributed over a cross-sectional periphery of the elongate drill arbor body.

3. The system of claim 1, wherein
the actuator member is provided with at least one actuator surface with at least a part which, in the direction from the first position of the actuator member to the second position thereof, runs obliquely in the direction of the central longitudinal axis of the elongate drill arbor body and is configured to come into contact with the at least one retaining element in response to the actuator member sliding from the first position to the second position.

4. The system of claim 3, wherein
the actuator surface is located at an end of the actuator member.

5. The system of claim 1, wherein
a plurality of retaining elements are provided at different positions as seen in a longitudinal direction of the elongate drill arbor body.

6. The system of claim 1, wherein
the at least one retaining element is a ball.

7. The system of claim 1, wherein
the operating element is positioned on the outer surface of the elongate drill arbor body, and is connected to the actuator member via a transverse bore in the longitudinal wall of the longitudinal bore of the elongate drill arbor body.

8. The system of claim 1, further comprising:
a spring element, configured to engage on the actuator member and force the actuator member in the direction of the second position thereof.

9. The system of claim 1, wherein
the longitudinal bore of the hole saw adapter and a part of the elongate drill arbor body to be inserted into the longitudinal bore of the hole saw adapter have a corresponding cross-sectional shape which is other than round.

10. The system of claim 9, wherein
the recess in the inner surface of the longitudinal bore of the hole saw adapter is a groove extending around the central longitudinal axis of the longitudinal bore of the hole saw adapter.

11. The system of claim 1, wherein
the longitudinal bore of the hole saw adapter is a continuous longitudinal bore.

12. The system of claim 11, wherein
a shape and dimensions of the elongate drill arbor body in the part of the elongate drill arbor body to be inserted into the longitudinal bore of the hole saw adapter are of constant cross-section over a portion of the length of the elongate drill arbor body such that, with the actuator member in the first position thereof, the hole saw adapter is displacable along the drill arbor body beyond the at least one retaining element in the direction of the first end of the elongate drill arbor body.

13. The system of claim 1, wherein
a part of the elongate drill arbor body to be inserted into the longitudinal bore of the hole saw adapter extends from a second end of the elongate drill arbor body in the direction of the first end of the drill arbor body.

14. The system of claim 1, further comprising:
a plurality of hole saw adapters, each arranged on or integrated into a respective hole saw.

15. A drill arbor, comprising:
a drill arbor body configured at a first end to be clamped in a drill chuck of a drill;
an actuator member and at least one retaining element co-acting therewith, wherein:
the actuator member is slidably receivable in a longitudinal bore of the drill arbor body and is slidable in longitudinal direction of the drill arbor body via an operating element;
the at least one retaining element is receivable in a transverse bore in a longitudinal wall of the longitudinal bore of the drill arbor body and is movable in a transverse direction of the drill arbor body; and
the actuator member is slidable between a first position and a second position, and
wherein:
the at least one retaining element is movable outward in the transverse direction of the drill arbor body by the actuator member in response to the actuator member sliding from the first position to the second position, so that the at least one retaining element protrudes partially from an outer surface of the drill arbor body;

the actuator member is configured to block, in the second position thereof, an inward movement of the at least one retaining element in the transverse direction of the drill arbor body; and the actuator member is configured to allow, in the first position thereof, an inward movement of the at least one retaining element in the transverse direction of the drill arbor body, and wherein:

the drill arbor is configured to be fitted to a hole saw adapter having a longitudinal bore in which the drill arbor body is receivable so that an inner surface of the longitudinal bore of the hole saw adapter is slidably mountable on the outer surface of the drill arbor body in the longitudinal direction of the drill arbor body, and the inner surface of the longitudinal bore of the hole saw adapter is provided with a recess into which the at least one retaining element of the drill arbor is protrudable.

16. A hole saw adapter for a drill arbor having a drill arbor body configured at a first end to be clamped in a drill chuck of a drill, an actuator member and at least one retaining element co-acting therewith, wherein the actuator member is slidably receivable in a longitudinal bore of the drill arbor body and is slidable in a longitudinal direction of the drill arbor body via an operating element, the at least one retaining element is receivable in a transverse bore in a longitudinal wall of the longitudinal bore of the drill arbor body and is movable in a transverse direction of the drill arbor body, and the actuator member is slidable between a first position and a second position, and wherein the at least one retaining element is movable outward in the transverse direction of the drill arbor body by the actuator member in response to the actuator member sliding from the first position to the second position, so that the at least one retaining element protrudes partially from an outer surface of the drill arbor body, the actuator member is configured to block, in the second position thereof, an inward movement of the at least one retaining element in the transverse direction of the drill arbor body, and the actuator member is configured to allow, in the first position thereof, an inward movement of the at least one retaining element in the transverse direction of the drill arbor body, the hole saw adapter being configured for arranging a hole saw thereon, or the hole saw adapter being integrated into a hole saw, the hole saw adapter comprising:

a longitudinal bore in which the drill arbor body is receivable so that an inner surface of the longitudinal bore of the hole saw adapter is slidably mounted on the outer surface of the drill arbor body in the longitudinal direction of the drill arbor body, wherein the inner surface of the longitudinal bore of the hole saw adapter is provided with a recess into which the at least one retaining element of the drill arbor is protrudable.

17. The system of claim 5, wherein each retaining element is movable outwardly in transverse direction of the drill arbor body by the actuator member in response to the actuator member sliding from the first position to the second position, so that the at least one retaining element protrudes partially from the outer surface of the elongate drill arbor body;

the actuator member is configured to block, in the second position thereof, an inward movement of each retaining element in transverse direction of the elongate drill arbor body; and the actuator member is configured to allow, in the first position thereof, an inward movement of each retaining element in a transverse direction of the elongate drill arbor body.

18. The drill arbor of claim 15, further comprising an operating element and a spring between the operating element and the at least one retaining element.

* * * * *